(12) United States Patent
DuPont et al.

(10) Patent No.: US 8,745,935 B2
(45) Date of Patent: Jun. 10, 2014

(54) PHOTOVOLTAIC PANEL FASTENING SYSTEM

(75) Inventors: Luc DuPont, Berkeley, CA (US); Brian C. Cheung, San Francisco, CA (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 13/273,284

(22) Filed: Oct. 14, 2011

(65) Prior Publication Data

US 2013/0091786 A1   Apr. 18, 2013

(51) Int. Cl.
E04D 13/18 (2014.01)
F24J 2/52 (2006.01)
H01L 31/042 (2014.01)

(52) U.S. Cl.
CPC ........... F24J 2/5203 (2013.01); H01L 31/0422 (2013.01)
USPC ...................................... 52/173.3

(58) Field of Classification Search
CPC ........ Y02E 10/47; Y02E 10/50; Y02B 10/12; H01L 31/0422; F24J 2/5203; F24J 2/5211; F24J 2/5258; F24J 2/5262
USPC ............. 52/173.3, 173.1, 705, 545, 546, 200, 52/588.1; 24/290, 295, 293
See application file for complete search history.

(56) References Cited

U.S. PATENT DOCUMENTS

| | | | | |
|---|---|---|---|---|
| 3,483,910 A | * | 12/1969 | Huffel et al. | 411/112 |
| 3,757,268 A | * | 9/1973 | Genovese et al. | 439/97 |
| 3,998,018 A | * | 12/1976 | Hodges | 52/481.2 |
| 4,106,251 A | * | 8/1978 | Nelsson | 52/489.2 |
| 4,113,982 A | * | 9/1978 | Glaesel | 174/158 R |
| 4,189,881 A | * | 2/1980 | Hawley | 52/91.3 |
| 4,195,895 A | * | 4/1980 | Ziegler | 439/99 |
| 4,215,677 A | * | 8/1980 | Erickson | 126/621 |
| 4,256,359 A | * | 3/1981 | Storck | 439/412 |
| 4,406,505 A | * | 9/1983 | Avramovich | 439/97 |
| 4,833,848 A | * | 5/1989 | Guerin | 52/242 |
| 4,875,876 A | * | 10/1989 | O'Loughlin | 439/431 |
| 5,092,939 A | * | 3/1992 | Nath et al. | 136/251 |
| 5,228,248 A | * | 7/1993 | Haddock | 52/25 |
| 5,232,518 A | * | 8/1993 | Nath et al. | 136/251 |

(Continued)

FOREIGN PATENT DOCUMENTS

DE         9409453 U1    8/1994
DE   102009055722 A1    6/2011

(Continued)

OTHER PUBLICATIONS

A Raymond drawing entitled "Solar clip Specific part"; Part No. 214803-1-00, for non-grounding clip shown in Solardis brochure; 1 page (believed to have been offered for sale in U.S. or published on or before Jul. 7, 2010).

altEstore; Internet Advertisement Publication; "Groundings Lugs With Set Screw"; www.altestore.com; Aug. 25, 2011.

Conergy Heavy Snow Roof Hook—20 Units; Internet publication; www.ecodirect.com; Oct. 4, 2011; 2 pages.

(Continued)

*Primary Examiner* — Joshua J Michener
*Assistant Examiner* — James Ference
(74) *Attorney, Agent, or Firm* — Harness, Dickey & Pierce, P.L.C.

(57) ABSTRACT

A fastening system is provided. In another aspect, a hook fastens a photovoltaic panel assembly to a building roof. Another aspect employs catches that removeably attach an auxiliary component, such as a solar panel frame, to a building in hinge and slide motions for engagement of the catches. A method of installing a fastening system is additionally provided.

30 Claims, 5 Drawing Sheets

(56) References Cited

U.S. PATENT DOCUMENTS

| | | | |
|---|---|---|---|
| 5,409,549 A * | 4/1995 | Mori | 136/244 |
| 5,419,606 A * | 5/1995 | Hull et al. | 296/146.7 |
| 5,483,772 A * | 1/1996 | Haddock | 52/25 |
| 5,491,931 A * | 2/1996 | Haddock | 52/25 |
| 5,571,338 A * | 11/1996 | Kadonome et al. | 136/251 |
| 5,694,721 A * | 12/1997 | Haddock | 52/24 |
| 5,715,640 A * | 2/1998 | Haddock | 52/545 |
| 5,762,720 A * | 6/1998 | Hanoka et al. | 136/251 |
| 5,983,588 A * | 11/1999 | Haddock | 52/545 |
| 6,105,317 A * | 8/2000 | Tomiuchi et al. | 52/173.3 |
| 6,111,189 A * | 8/2000 | Garvison et al. | 136/244 |
| 6,123,314 A | 9/2000 | Steele | |
| 6,164,033 A * | 12/2000 | Haddock | 52/545 |
| 6,186,698 B1 * | 2/2001 | Knapp | 403/397 |
| 6,269,596 B1 * | 8/2001 | Ohtsuka et al. | 52/173.3 |
| 6,370,828 B1 * | 4/2002 | Genschorek | 52/200 |
| 6,405,494 B1 * | 6/2002 | Wismeth | 52/173.3 |
| 6,414,237 B1 * | 7/2002 | Boer | 136/251 |
| 6,495,750 B1 | 12/2002 | Dinwoodie | |
| 6,501,013 B1 | 12/2002 | Dinwoodie | |
| 6,534,703 B2 | 3/2003 | Dinwoodie | |
| 6,570,084 B2 | 5/2003 | Dinwoodie | |
| 6,672,018 B2 * | 1/2004 | Shingleton | 52/173.3 |
| 6,688,047 B1 * | 2/2004 | McNichol | 52/25 |
| 6,718,718 B2 * | 4/2004 | Haddock | 52/545 |
| 6,784,360 B2 * | 8/2004 | Nakajima et al. | 136/251 |
| 6,809,253 B2 | 10/2004 | Dinwoodie | |
| 6,959,517 B2 * | 11/2005 | Poddany et al. | 52/173.3 |
| 7,013,612 B2 * | 3/2006 | Haddock | 52/545 |
| 7,100,338 B2 * | 9/2006 | Haddock | 52/545 |
| 7,195,513 B1 * | 3/2007 | Gherardini et al. | 439/401 |
| 7,297,866 B2 * | 11/2007 | Aschenbrenner | 136/246 |
| 7,386,922 B1 * | 6/2008 | Taylor et al. | 24/569 |
| 7,435,134 B2 * | 10/2008 | Lenox | 439/567 |
| 7,568,671 B2 * | 8/2009 | Lallier | 248/237 |
| 7,592,537 B1 * | 9/2009 | West | 136/251 |
| 7,600,349 B2 * | 10/2009 | Liebendorfer | 52/173.3 |
| 7,621,487 B2 * | 11/2009 | Brown et al. | 248/65 |
| 7,634,875 B2 * | 12/2009 | Genschorek | 52/173.3 |
| 7,703,256 B2 * | 4/2010 | Haddock | 52/543 |
| 7,745,722 B2 * | 6/2010 | Warfield et al. | 136/244 |
| 7,748,175 B2 * | 7/2010 | Liebendorfer | 52/173.3 |
| 7,758,011 B2 * | 7/2010 | Haddock | 248/500 |
| 7,766,292 B2 * | 8/2010 | Liebendorfer | 248/237 |
| 7,780,472 B2 * | 8/2010 | Lenox | 439/567 |
| 7,797,883 B2 * | 9/2010 | Tarbell et al. | 52/27 |
| 7,866,099 B2 * | 1/2011 | Komamine et al. | 52/173.3 |
| 7,971,398 B2 * | 7/2011 | Tweedie | 52/173.3 |
| 7,987,641 B2 * | 8/2011 | Cinnamon | 52/173.3 |
| 8,025,508 B2 * | 9/2011 | Parker et al. | 439/92 |
| 8,092,129 B2 | 1/2012 | Wiley et al. | |
| 8,162,039 B2 | 4/2012 | Cao et al. | |
| 8,272,172 B2 | 9/2012 | Li | |
| 8,353,650 B2 | 1/2013 | Wiley et al. | |
| 2002/0088196 A1 * | 7/2002 | Haddock | 52/543 |
| 2003/0015637 A1 * | 1/2003 | Liebendorfer | 248/237 |
| 2003/0070368 A1 * | 4/2003 | Shingleton | 52/173.3 |
| 2003/0101662 A1 * | 6/2003 | Ullman | 52/27 |
| 2003/0177706 A1 * | 9/2003 | Ullman | 52/3 |
| 2003/0198530 A1 * | 10/2003 | Hoffmann et al. | 411/84 |
| 2003/0206785 A1 * | 11/2003 | Hoffmann et al. | 411/84 |
| 2004/0163338 A1 * | 8/2004 | Liebendorfer | 52/173.1 |
| 2005/0226683 A1 * | 10/2005 | Herb | 403/230 |
| 2006/0156648 A1 * | 7/2006 | Thompson et al. | 52/173.3 |
| 2007/0051053 A1 * | 3/2007 | Hockman | 52/25 |
| 2008/0010915 A1 * | 1/2008 | Liebendorfer | 52/173.3 |
| 2008/0035140 A1 * | 2/2008 | Placer et al. | 126/622 |
| 2008/0053517 A1 * | 3/2008 | Plaisted et al. | 136/251 |
| 2008/0245404 A1 * | 10/2008 | DeLiddo | 136/251 |
| 2008/0302928 A1 * | 12/2008 | Haddock | 248/205.1 |
| 2009/0000220 A1 * | 1/2009 | Lenox | 52/173.1 |
| 2009/0025314 A1 * | 1/2009 | Komamine et al. | 52/173.3 |
| 2009/0242014 A1 * | 10/2009 | Leary | 136/251 |
| 2009/0260792 A1 | 10/2009 | Yalin et al. | |
| 2010/0058701 A1 * | 3/2010 | Yao et al. | 52/547 |
| 2010/0065108 A1 * | 3/2010 | West et al. | 136/251 |
| 2010/0088996 A1 * | 4/2010 | Thompson et al. | 52/704 |
| 2010/0170163 A1 * | 7/2010 | Tarbell et al. | 52/27 |
| 2010/0171016 A1 * | 7/2010 | Haddock | 248/237 |
| 2010/0180933 A1 * | 7/2010 | Aftanas et al. | 136/251 |
| 2010/0192055 A1 * | 8/2010 | Schaefer et al. | 52/653.2 |
| 2010/0236162 A1 * | 9/2010 | Tweedie | 52/127.6 |
| 2010/0236542 A1 * | 9/2010 | Pierson et al. | 126/621 |
| 2010/0263297 A1 * | 10/2010 | Liebendorfer | 52/11 |
| 2010/0269430 A1 * | 10/2010 | Haddock | 52/173.3 |
| 2010/0276558 A1 * | 11/2010 | Faust et al. | 248/222.14 |
| 2010/0284737 A1 * | 11/2010 | McPheeters | 403/374.3 |
| 2011/0036028 A1 * | 2/2011 | Beck | 52/173.3 |
| 2011/0039430 A1 * | 2/2011 | Aftanas | 439/92 |
| 2011/0073155 A1 | 3/2011 | Sillmann et al. | |
| 2011/0088740 A1 | 4/2011 | Mittan et al. | |
| 2011/0100433 A1 | 5/2011 | Jonczyk | |
| 2011/0138585 A1 | 6/2011 | Kmita et al. | |
| 2011/0147553 A1 | 6/2011 | Ostermeier et al. | |
| 2011/0179606 A1 | 7/2011 | Magno, Jr. et al. | |
| 2011/0203637 A1 | 8/2011 | Patton et al. | |
| 2011/0214366 A1 | 9/2011 | Haddock et al. | |
| 2011/0214367 A1 * | 9/2011 | Haddock et al. | 52/173.3 |
| 2011/0214368 A1 * | 9/2011 | Haddock et al. | 52/173.3 |
| 2011/0232212 A1 * | 9/2011 | Pierson et al. | 52/173.3 |
| 2011/0284058 A1 | 11/2011 | Cinnamon | |
| 2012/0032045 A1 * | 2/2012 | Lallier et al. | 248/237 |
| 2012/0240489 A1 | 9/2012 | Rivera et al. | |
| 2012/0244729 A1 | 9/2012 | Rivera et al. | |
| 2013/0078053 A1 | 3/2013 | Wiley et al. | |

FOREIGN PATENT DOCUMENTS

| | | |
|---|---|---|
| DE | 102010022556 B3 | 6/2011 |
| EP | 0671581 A2 | 9/1995 |
| EP | 2327942 A2 | 6/2011 |
| EP | 2363661 A2 | 9/2011 |
| FR | 2163787 A5 | 7/1973 |
| FR | 2209024 A1 | 6/1974 |
| GB | 423385 A | 1/1935 |
| GB | 1218275 A | 1/1971 |
| GB | 1510258 A | 5/1978 |
| JP | 60050348 A | 3/1985 |
| JP | 7243428 A | 9/1995 |
| JP | 10266499 A | 10/1998 |
| JP | 10339008 A | 12/1998 |
| KR | 1020110116416 | 10/2011 |
| NL | 8304155 A | 7/1985 |
| WO | WO-8301476 A1 | 4/1983 |
| WO | WO-9816699 A1 | 4/1998 |
| WO | WO-2010149278 A1 | 12/2010 |
| WO | WO-2012/014203 | 2/2012 |

OTHER PUBLICATIONS

Conergy Sun Top CMS-10057 Double Roman Tile Roof Hook—20 pack; Internet publication; www.ecodirect.com; Oct. 4, 2011; 2 pages.

Conergy Sun Top CMS-10059 Flat Tile Roof Hook—20 pack; Internet publication; www.ecodirect.com; Oct. 4, 2011; 2 pages.

Rayvolt; Internet Advertisement Publication; "Panel fasteners"; Raygroup; May, 2011.

Solar Stainless Steel Roof Hook; Internet publication; www.alibaba.com; Oct. 4, 2011; 2 pages.

Solardis; Brochure; "soprasolar fix"; www.soprasolar.com; Jul. 7, 2010; pp. 1-10.

Stainless Steel Hook Solar Panel Roofing Hook; Internet publication; www.alibaba.com; Oct. 4, 2011; 1 page.

Stainless Steel Hook Solar Panel Roofing Hook; Internet publication; www.alibaba.com; Oct. 4, 2011; 2 pages.

Stainless Steel Hook Solar Panel Roofing Hook; Internet publication; www.alibaba.com; Oct. 4, 2011; 3 pages.

Stainless Steel Tin Roof Hook SS Tin Hook; Internet publication; www.alibaba.com; Oct. 4, 2011; 2 pages.

* cited by examiner

PHOTOVOLTAIC PANEL FASTENING SYSTEM

BACKGROUND AND SUMMARY

The present application relates generally to an attachment system and more particularly to a photovoltaic panel fastening system for a building.

Conventional photovoltaic or solar panels are mounted to roofs of buildings through screw-in clips or the like. Examples of such conventional devices are disclosed in U.S. Patent Publication No. 2011/0088740 entitled "Photovoltaic Panel Clamp" which published to Mittan et al. on Apr. 21, 2011, and U.S. Pat. No. 6,672,018 entitled "Solar Module Mounting Method and Clip" which issued to Shingleton on Jan. 6, 2004, both of which are incorporated by reference herein. Such conventional methods cause the installer to juggle many loose fasteners while simultaneously holding heavy solar panels and/or roof mounting components, often on a tilted metal roof in unpleasant weather conditions. Furthermore, such traditional multi-piece screw or bolt arrangements take considerable time to install while also having inconsistent installation torque values, especially in the common situation where many of these solar panel mounting devices are required for each roof.

In accordance with the present invention, a fastening system is provided. In another aspect, a hook fastens a photovoltaic panel assembly to a building roof. Another aspect employs catches that removeably attach an auxiliary component, such as a solar panel frame, to a building in hinge and slide motions for engagement of the catches. A method of installing a fastening system is additionally provided.

The present attachment system is advantageous over traditional devices. For example, in one aspect, a simplified installation motion is employed to engage an auxiliary component, such as a photovoltaic panel assembly, with a mounting hook. In an aspect of the present attachment system, an auxiliary roof component is quickly and easily secured to a building roof in a fast manner without requiring the installer to juggle multiple parts. In another aspect, a catch of the fastening system is very inexpensive to manufacture and assemble. Furthermore, the present fastening system is preassembled to a building roof via an easy to install roof clamp, prior to assembly of the solar panel assembly to the fastening system. The catch of the present attachment system ideally allows for tolerance variations and part expansion. Additional advantageous and features of the present invention will become apparent in the following description and appended claims, taking in conjunction with the accompanying drawings.

DETAILED DESCRIPTION

Figures 1, 8:
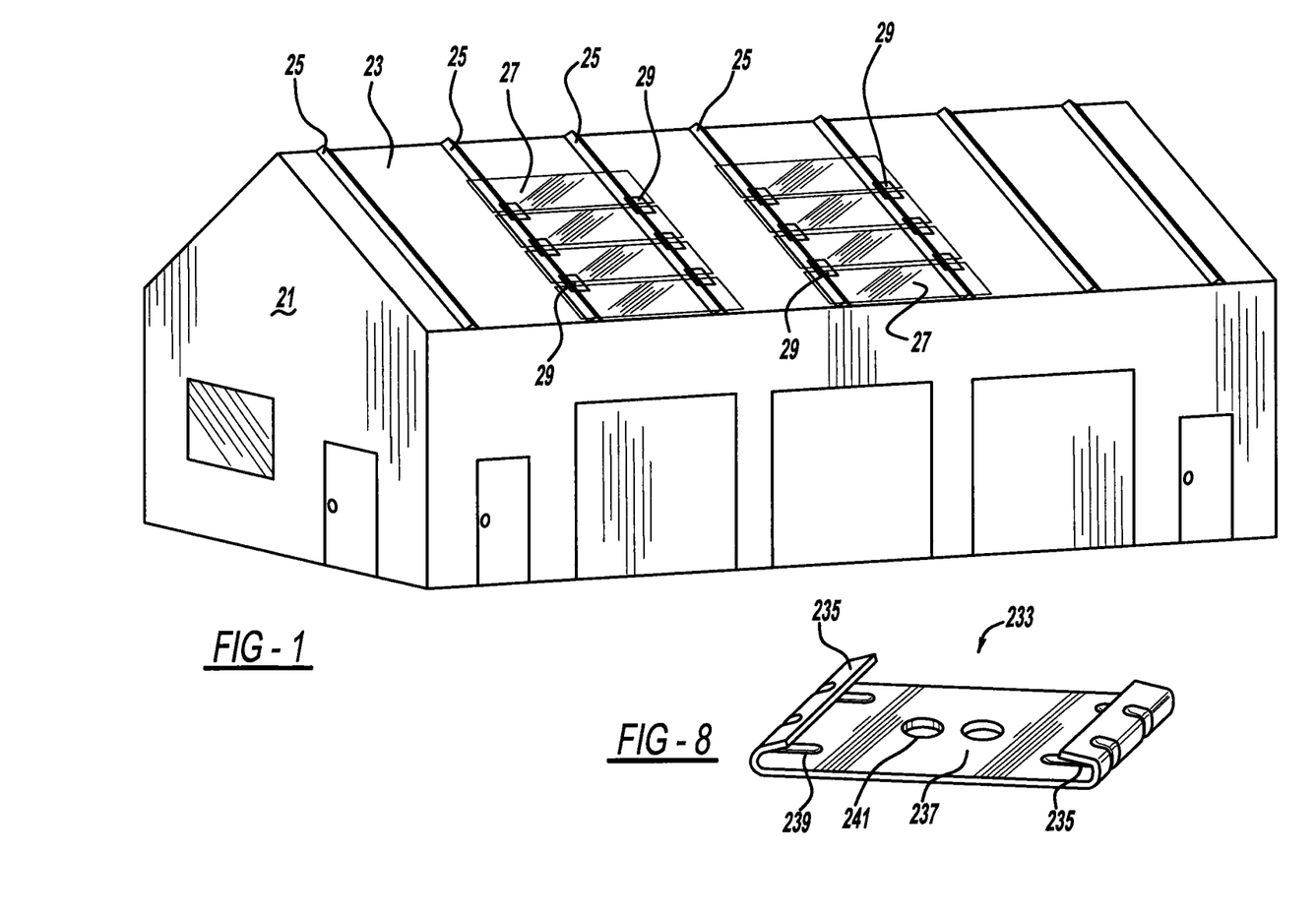
FIG. 1 is a perspective view showing a preferred embodiment fastening system securing photovoltaic panel assemblies to a building roof.
FIG. 8 is a perspective view showing a catch of an alternate embodiment fastening system.
Figure 2:
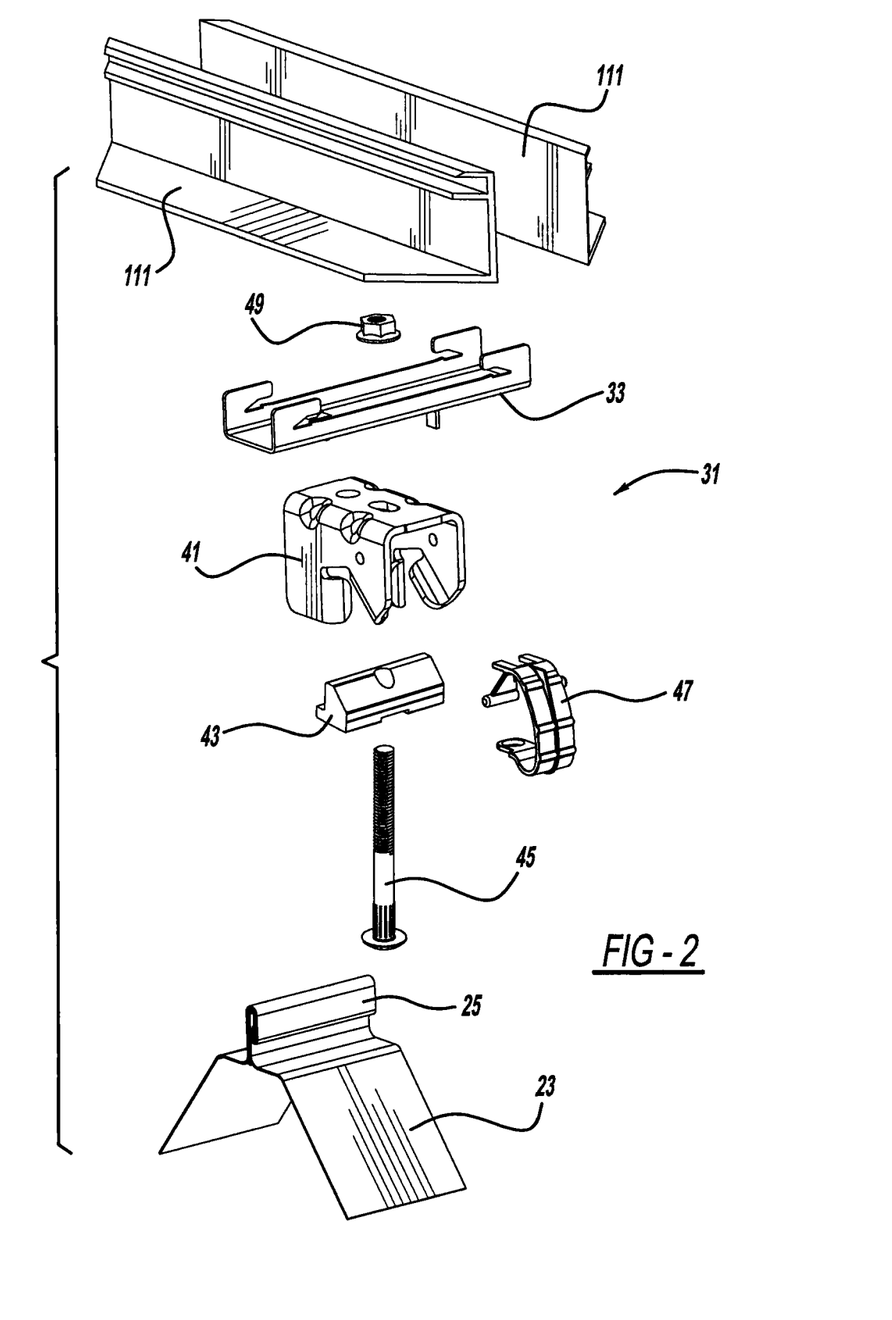
FIG. 2 is an exploded perspective view showing the preferred embodiment fastening system.
Figure 3:
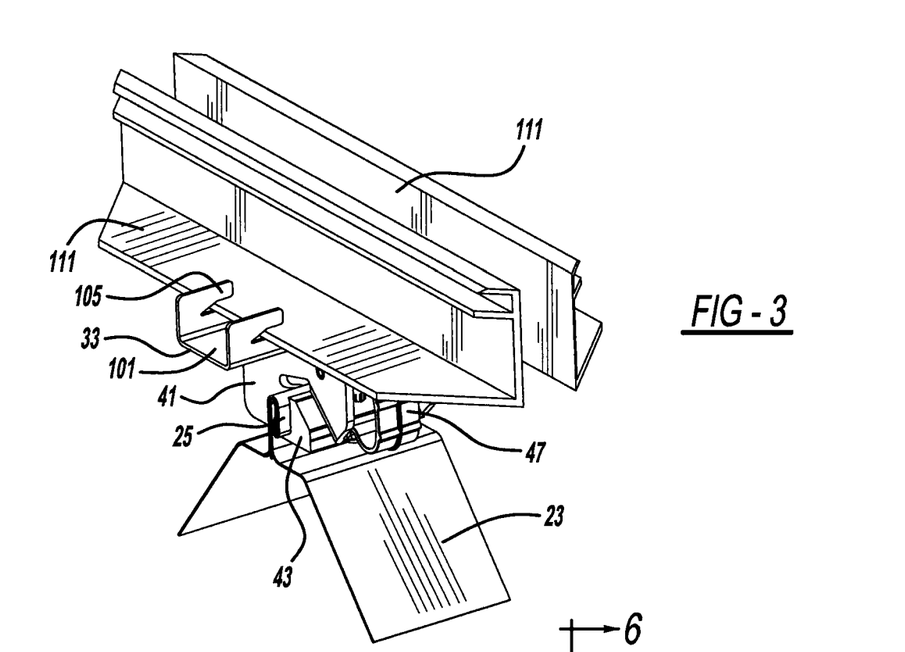
FIG. 3 is a perspective view showing the preferred embodiment fastening system retaining photovoltaic panel frames.
Figure 4:
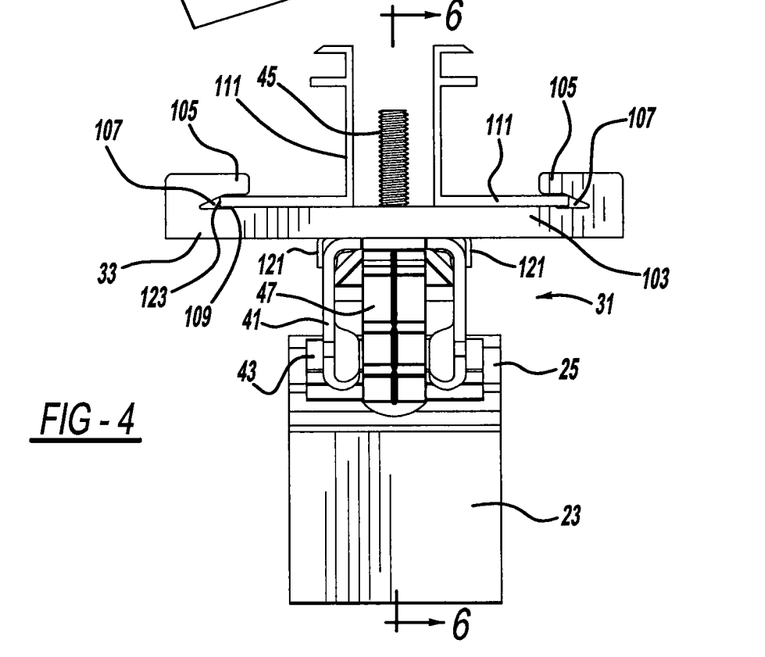
FIG. 4 is an end elevational view showing the preferred embodiment fastening system retaining the frames.
Figure 5:
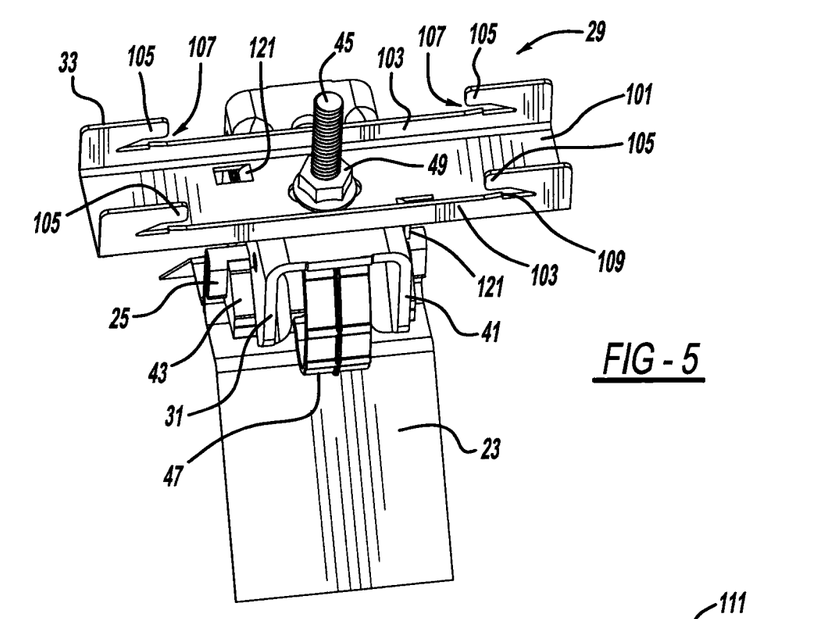
FIG. 5 is a perspective view showing the preferred embodiment fastening system.
Figure 6:
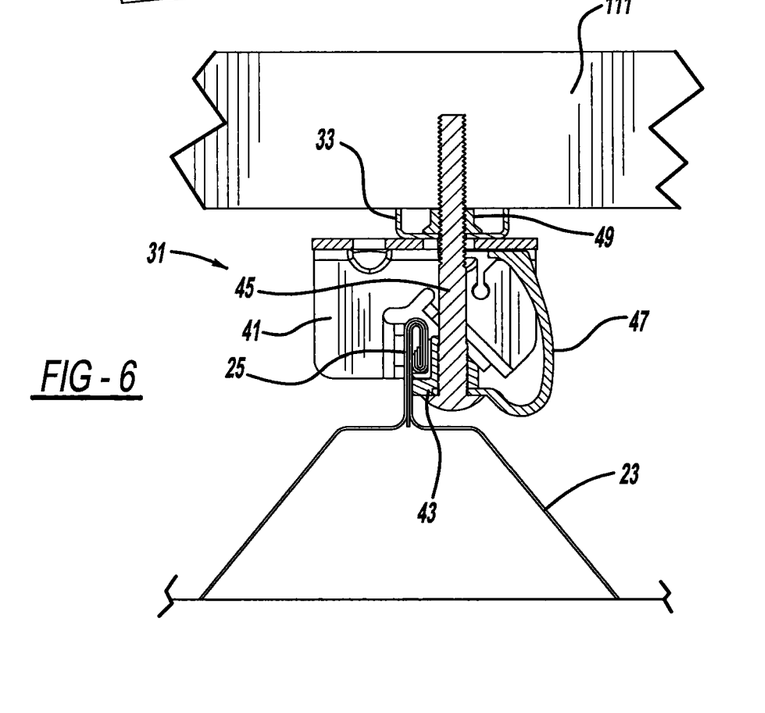
FIG. 6 is a cross-sectional view, taken along line 6-6 of FIG. 4, showing the preferred embodiment fastening system retaining the frames.
Figure 7:
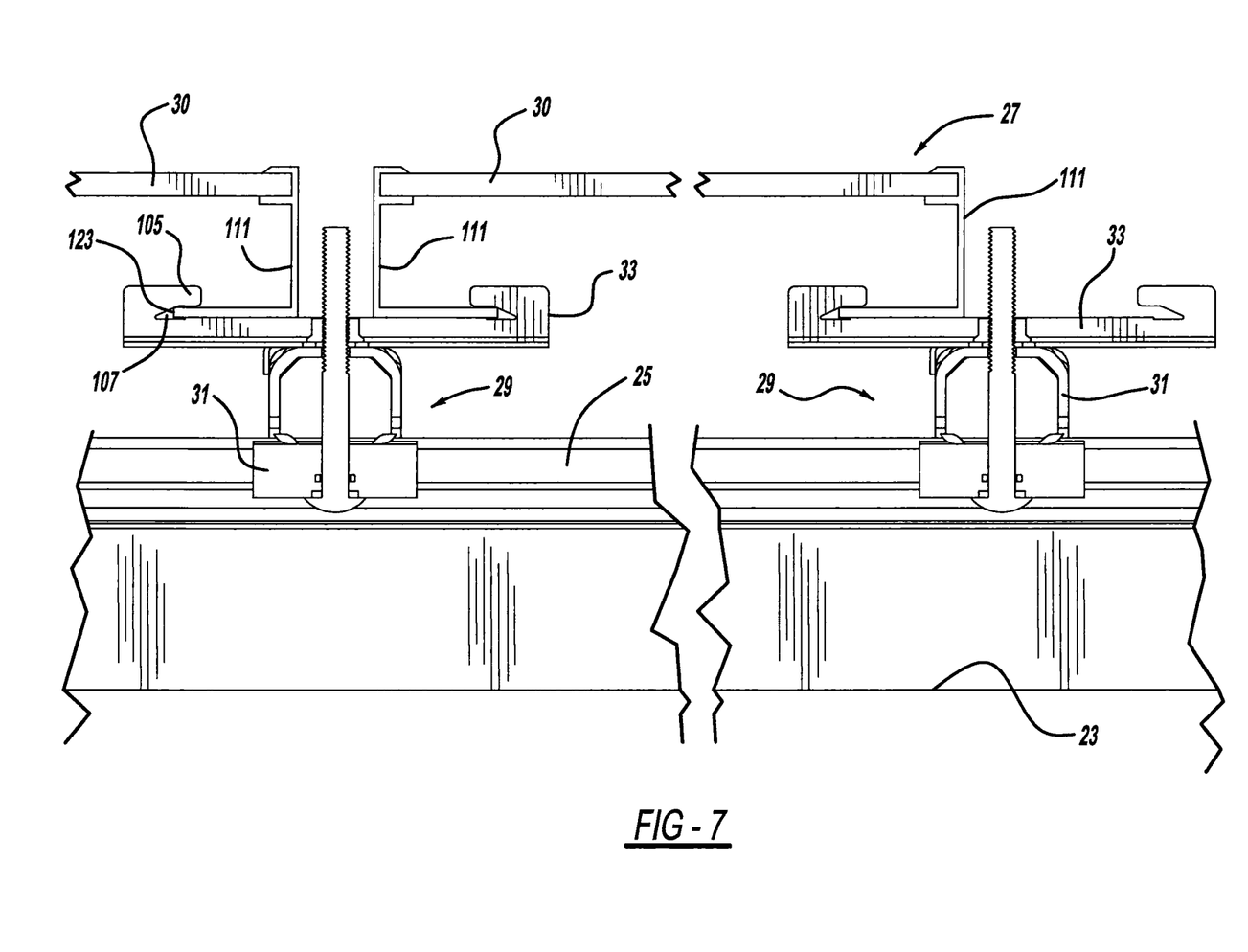
FIG. 7 is an end elevational view showing a pair of preferred embodiment fastening systems retaining the photovoltaic panel assemblies.

FIGS. 1 and 7 illustrate a building 21 having a tilted roof 23, preferably made from sheet metal sections joined together at folded over, raised standing seams 25. Auxiliary roof components, preferably multiple photovoltaic or solar panel assemblies 27, are secured to seams 25 by way of multiple fastening systems 29. Each photovoltaic panel assembly includes metal and glass sheets 30 with silicon wafers, attached to peripheral mounting frames 111. Each fastening system 29 includes a roof clamp 31 and a catch or mounting bracket 33.

FIGS. 2 and 4-6 depict roof clamp 31 attached to seam 25 of roof 23. Roof clamp 31 includes a saddle 41, a roof seam-engaging wedge 43, and an elongated shaft or securing member 45. A generally C-shaped leaf spring 47 has pins at one end attached to holes in saddle 41, and is trapped between a head of shaft 45 and wedge 43 at the other end. Spring 47 serves to retain wedge 43 to saddle 41 in a pre-assembled state prior to seam installation while also biasing wedge 43 into a clamping position toward a top wall of saddle 41 and seam 25. Thus, camming action of roof seam-engaging wedge 43 along diagonal internal surfaces of saddle 41 compresses roof clamp 31 to seam 25. Tightening of a nut 49 onto shaft 45 secures wedge 43, and thus roof clamp 31, to the seam. When an installer manually pushes a proximal exposed end of shaft 45 (opposite its head) toward saddle 41, against the biasing force of spring 47 and through an oversized hole in the top wall of the saddle, wedge 43 is pushed to an open position allowing seam access into an opening of saddle 41. Notably the same shaft 45 that secures roof clamp 31 to roof 23 also secures an auxiliary-retaining device, such as catch 33, to roof 23 along a top surface of saddle 41.

Saddle 41, roof seam-engaging wedge 43, shaft 45, spring 47 and optionally catch 33, are pre-assembled prior to placing roof clamp 31 in the proximity of roof seam 25. "Pre-assembled" for the clamp refers to the components being attached as a single unit such that shaft 45, and optionally a very loose engagement of nut 49 (so as to provide lost motion movement of the spring and wedge relative to the saddle), keep them attached together. This can be achieved either on the ground at the work site, at a remote site, or at the factory in which roof clamp 31 is manufactured. When wedge 43 is retracted to trap seam 25 between an inner foot of the wedge and the inner opening edge of saddle 41, a portion of shaft 45 extends beyond the top surface of saddle 41 such that the proximal threaded end of shaft 45 also provides an attachment point for catch 33 and nut 49. The roof clamp preferably attaches to the roof seam due to lateral seam compression of the wedge but without seam piercing or side-mounted threaded screws.

Referring now to FIGS. 3-5 and 7, catch 33 is preferably a stamped metal bracket including a generally flat and rectangular base wall 101, upwardly bent side walls 103 and at least two, and more preferably four, hooks 105 disposed upon side walls 103 adjacent corners of the catch. The side walls are of reduced height between the associated pairs of hooks. Each hook 105 has an inwardly facing access slot 107 defined by a somewhat triangularly shaped inside wall surface. Moreover, an upwardly pointed barb 109 extends from an upper edge of side wall 103 below each hook 105 to gouge into a bottom of frame 111 secured in access slot 107. Barbs 109 may optionally serve as electrical grounding connections to frame 111.

A slotted aperture is centrally provided in bottom wall 101 of catch 33 to receive the threaded end of shaft 45 for nut attachment thereto. Furthermore, at least two tabs 121 are downwardly bent from bottom wall 101 of catch 33. These tabs 121 assist in orienting catch 33 relative to saddle 41 of roof clamp 31 prior to full securing of nut 49 on shaft 45. Catch 33 has a generally U-shape when viewed from its end, such as in FIG. 6.

Catch 33 advantageously provides a hinge and slide fastening motion for photovoltaic panel assembly 27. More specifically, the installer first couples each of the preassembled roof clamps 31, including catches 33, onto roof seams 25 in a single top down, manually actuated motion; spring 47 will thereby cause the camming action to laterally move wedge 43 into compression against seam 25. Nuts 49 are then rotatably tightened on only the hinge side fastening systems 29, preferably near the lower edge of the tilted roof 23 first (the rightmost system 29 shown in FIG. 7). Secondly, the installer aligns one of the photovoltaic panel assemblies above the associated lower catches 33 designated for same (e.g., two or more for each bottom and top side). Next, the installer inserts and engages a distal end 123 of a first frame 111 of one side of panel assembly 27 into slot 107 between hook 105 and barb 109. Fourthly, the installer downwardly pivots the opposite top side of panel assembly 27 about the already engaged catch 33 in a hinged manner. Fifthly, each opposite top catch 33 (shown as the leftmost system 29 in FIG. 7, which is closer to a peak of roof 23), whose nut 49 is engaged but still loose, is then laterally slid to engage its hook 105 with its associated second frame 111; this thereby inserts and engages distal end 123 of this second frame 111 within access slot 107 of the second and top catch 33. Sixthly, after the uphill, top frame 111 of the photovoltaic panel assembly is securely engaged by the associated top catches 33, the installer uses a tool, such as a socket wrench, to tighten nuts 49 on the associated fastening assemblies 29. The nut tightening serves multiple purposes: to secure the catches to the roof clamps in frame mounting positions, and to secure the roof clamps to the roof seams. Finally, a second photovoltaic assembly 27 can be secured to the now stationary opposite hooks of the up-hill catch 33 while a further uphill catch is adjustable slid to engage a frame in a similar manner to the preceeding steps (as shown to the left of FIG. 7), and so on. Furthermore, all of these panel assemblies and components can be easily disassembled by loosening the single nut on each fastening system 29.

Finally, an alternate embodiment catch or mounting bracket 233 is shown in FIG. 8. This catch 233 is made by stamping and bending a sheet metal piece to form inwardly curved end wall hooks 235 laterally outboard of a primarily flat bottom wall 237. Each hook 235 has a generally C-shape with an internal access slot for receiving a photovoltaic panel frame as in the prior embodiment. Stiffening beads 239 are also stamped into end wall hooks 235 and at least one hole 241 is pierced or drilled into bottom wall 237. Moreover, catch 233 is secured to a roof clamp in the same manner as the prior embodiment.

While various aspects of the present fastening system have been disclosed, it should be appreciated that modifications can be made. For example, the present accessory mounting brackets or catches can be secured to conventional roof clamps such as those disclosed in the following U.S. Pat. No. 7,758,011 entitled "Adjustable Mounting Assembly for Standing Seam Panels" which issued to Haddock on Jul. 20, 2010; U.S. Pat. No. 7,386,922 entitled "Snow-Guard Clamping Unit" which issued to Taylor et al. on Jun. 17, 2008; and U.S. Pat. No. 5,715,640 entitled "Mounting Device for Controlling Uplift of a Metal Roof" which issued to Haddock on Feb. 10, 1998; except many of the present advantages will not be realized. These patents are incorporated by reference herein. Moreover, more or less hooks and barbs can be attached to a single bracket although some of the present advantages may not be obtained. It is also envisioned that the fastening system is attachable to an exterior side of a building or a ground-based structure, although various advantages may not be achieved. Furthermore, the catches can be injected molded from a polymer, cast from aluminum, or otherwise differently manufactured, however, various advantages may not be obtained. The frame can also have a different shape although certain advantages may not be observed. Individual elements or features of a particular embodiment are generally not limited to that particular embodiment, but, where applicable, are interchangeable and can be used in a selected embodiment, even if not specifically shown or described. Such variations are not to be regarded as a departure from the disclosure, and all such modifications are intended to be included within the scope of the present invention.

The invention claimed is:

1. A photovoltaic panel fastening system comprising a catch including a base wall and four hooks upstanding from the base wall, the hooks each including an overhanging section overhanging an openly accessible access slot being defined by each of the hooks, the access slots being located between the base wall and the overhanging section of the hooks, the hooks being openly accessible toward each other, each of the hooks being located adjacent each corner of the catch and each of the hooks being spaced away from the others, and each of the hooks being configured to receive and secure a portion of an associated photovoltaic panel frame within the access slots between the upstanding portions of the hooks.

2. The system of claim 1, further comprising a standing seam roof clamp attached to the catch, the clamp using only a single threaded fastener.

3. The system of claim 1, further comprising a roof clamp, the catch being slidably adjustable relative to the roof clamp in at least one condition.

4. The system of claim 1, further comprising a roof clamp, the catch being pre-assembled to the roof clamp prior to mounting of the roof clamp to a building roof, and a shaft and roof seam-engaging member of the roof clamp being entirely pre-assembled to a saddle of the clamp prior to mounting of the clamp to the building roof.

5. The system of claim 1, wherein the catch further comprises a pointed barb located adjacent at least one of the hooks, the barb being adapted to gouge into the frame.

6. The system of claim 1, wherein the catch further comprises side walls upstanding from the base wall which is substantially flat and a single piece with a central hole therethrough, and the catch having a substantially U-end view shape.

7. The system of claim 1, wherein the photovoltaic panel frame includes an L-shaped portion with a distal end of a bottom of the frame being snugly received within the slot of at least one of the hooks.

8. The system of claim 1, further comprising:
another catch including a base wall and hooks upstanding from the base wall; and
a second photovoltaic panel frame, the frames being mounted to opposite peripheral sides of a photovoltaic panel;

one of the frames initially engaging at least one of the hooks of at least a first of the catches and then being rotated to a position against at least a second of the catches whereafter the second catch is laterally slid relative to the first catch and photovoltaic panel so as to engage the second frame with at least one of the hooks of the second catch, the second catch subsequently being removably secured.

9. The system of claim 1, wherein the slots are spaced apart from each other, at least one of the access openings of the slots facing toward another of the access openings of the slots, and the hooks are sheet metal.

10. The system of claim 1, wherein the overhanging section of at least one of the hooks includes a distal end, the overhanging section of the at least one of the hooks is elongated substantially parallel to the base wall with the associated access slot being elongated substantially parallel to the base wall, and the overhanging section and an openly accessible portion of the access slot both face toward another of the hooks.

11. The system of claim 1, wherein the catch further includes side walls upturned from the base wall in the same direction as the hooks, the side walls having a reduced height relative to the hooks.

12. A photovoltaic panel fastening system comprising:
a removeable, roof seam clamp;
a bracket comprising a single piece base wall and upstanding side hooks overhanging photovoltaic panel frame-engaging slots, the side hooks being integrally coupled to the single piece base wall;
an elongated shaft and fastener allowing pre-assembled adjustment of the bracket relative to the clamp in one condition and firmly securing the bracket to the clamp in a second condition, the fastener also actuating roof seam-compression of the clamp;
access opening portions of the slots and distal ends of the overhanging hooks facing toward a plane defined through the shaft and substantially perpendicular to the base wall; and
a photovoltaic panel frame including an L-shaped portion with a distal end of a bottom of the frame being snugly received within at least one of the slots.

13. The system of claim 12, wherein the bracket includes four of the hooks, each hook being located adjacent each corner of the bracket.

14. The system of claim 12, wherein the bracket further comprises a pointed barb located adjacent at least one of the hooks, the barb gouging into the frame.

15. The system of claim 12, wherein the bracket further comprises side walls upstanding from the base wall which is substantially flat, the side hooks integrally projecting from the side walls, and the member having a substantially U-end view shape.

16. The system of claim 12, wherein at least one of the slots is at least partially defined by two acutely angled surfaces.

17. The system of claim 12, wherein the bracket is a single piece stamped metal sheet and the fastener is a threaded nut, with the bracket located between the nut and the clamp.

18. The system of claim 12, wherein the slots are spaced apart from each other, at least one of the access openings of the slots facing toward another of the access openings of the slots, the hooks are sheet metal, and an enlarged head is integrally attached to the shaft at an end opposite the bracket.

19. A photovoltaic panel fastening system comprising:
a photovoltaic panel assembly including a substantially flat photovoltaic panel having an upper surface, at least one frame having a first leg adjacent one side of the assembly and at least a second leg adjacent an opposite side of the assembly;
a first building clamp including an opening within which a fastener is moveable;
at least a second building clamp including an opening within which a fastener is movable, the fastener of each of the clamps including a shaft, and a cammed wedge being secured to the building by a fastener pulling on the shaft which also assists in securing a first bracket to the clamp;
the first bracket comprising a base wall and a hook, the first bracket being attached to the first clamp; and
at least a second bracket comprising a base wall and a hook, the second bracket being attached to the second clamp and being spaced apart from the first clamp;
the hook of the first bracket engaging the first leg of the photovoltaic panel assembly and allowing the photovoltaic panel assembly to be subsequently pivoted toward the second bracket, the first leg being trapped between the hook and the underlying base wall of the first bracket; and
the second bracket being laterally adjustable relative to the second clamp, in a lateral direction substantially parallel to a plane defined by the upper surface of the photovoltaic panel when installed and also independently of the photovoltaic panel assembly, to engage the hook of the second bracket with the second leg of the photovoltaic panel assembly.

20. The system of claim 19, wherein each of the brackets includes at least two inwardly pointing hooks having slots below the hooks openly accessible facing toward each other.

21. The system of claim 20, wherein the second bracket further comprising side walls upturned from the base wall which is substantially flat, the side walls having a reduced height relative to the hooks.

22. The system of claim 19, wherein the second bracket further comprises:
at least four of the hooks located adjacent corners of the second bracket;
at least one aperture in the base wall through which the shaft, which is threaded, extends from the second clamp;
the base wall is elongated in an up-hill direction when secured to the building by the second clamp; and
the second bracket has substantially U-shaped and open ends.

23. The system of claim 19, wherein distal ends of at least two of the hooks point toward each other, a lateral thickness of each of the hooks is less than a perpendicular height thereof, and the bracket is sheet metal.

24. A photovoltaic panel fastening system comprising a metallic bracket including a single piece base wall and at least two hooks upstanding from the base wall with an openly accessible access slot being defined by each of the hooks, at least one of the hooks being openly accessible toward another of the hooks, and each of the hooks being configured to receive and secure a portion of a photovoltaic panel frame between a section of the hook overhanging the base wall with the slot therebetween, an access opening portion of a first of the slots being spaced apart from and inwardly facing toward an access opening portion of a second of the slots, a hole in the single piece base wall centrally located substantially between the hooks, and the bracket further comprising a pointed barb located within the access slot of at least one of the hooks, the barb being adapted to gouge into the frame.

25. The system of claim 24, further comprising a standing seam roof clamp attached to the bracket.

26. The system of claim 24, wherein the bracket includes four of the hooks, the hooks being spaced apart and located adjacent each corner of the bracket.

27. The system of claim 24, wherein the photovoltaic panel frame includes an L-shaped portion with a distal end of a bottom of the frame being snugly received within the slot of at least one of the hooks.

28. The system of claim 24, wherein distal ends of at least two of the hooks point toward each other, a lateral thickness of each of the hooks is less than a perpendicular height thereof, and the bracket is sheet metal.

29. A photovoltaic panel fastening system comprising:
a removeable, roof seam clamp;
a bracket comprising a base wall and upstanding side hooks overhanging photovoltaic panel frame-engaging slots, the side hooks being integrally coupled to the base wall; and
an elongated shaft and fastener allowing pre-assembled adjustment of the bracket relative to the clamp in one condition and firmly securing the bracket to the clamp in another condition;
access opening portions of the slots and distal ends of the overhanging hooks facing toward a plane defined through the shaft and substantially perpendicular to the base wall;
the bracket further including side walls upturned from the base wall in a same direction as the hooks, and the side walls having a reduced height relative to the hooks.

30. The system of claim 29, wherein the bracket includes four of the hooks which are spaced apart from each other, at least one of the hooks is configured to secure a photovoltaic panel frame between at least a pair of the hooks, the bracket is sheet metal and at least a portion of the clamp is sheet metal.

* * * * *